United States Patent [19]

Schmitt et al.

[11] Patent Number: 5,006,686
[45] Date of Patent: Apr. 9, 1991

[54] CONTROL OF STUD-WELDING APPARATUS

[75] Inventors: Klaus G. Schmitt, Giessen; Harald Knetsch, Herborn, both of Fed. Rep. of Germany

[73] Assignee: Emhart Inc., Newark, Del.

[21] Appl. No.: 578,547

[22] Filed: Sep. 6, 1990

[30] Foreign Application Priority Data

Sep. 15, 1989 [DE] Fed. Rep. of Germany ....... 3930929

[51] Int. Cl.⁵ ............................................. B23K 9/20
[52] U.S. Cl. ................................................... 219/99
[58] Field of Search ..................................... 219/98, 99

[56] References Cited

U.S. PATENT DOCUMENTS 3,242,307  3/1966  Mowry et al. ................ 219/98
3,456,090  7/1969  Wenrich et al. .............. 219/98
4,562,328  12/1985  Shoup .......................... 219/98

FOREIGN PATENT DOCUMENTS 3803416  3/1989  Fed. Rep. of Germany ........ 219/98

Primary Examiner—Clifford C. Shaw
Attorney, Agent, or Firm—Spencer T. Smith

[57] ABSTRACT

Method of controlling stud-welding apparatus wherein the lifting coil is essentially current and voltage free at the beginning of the plunge stroke but the plunge stroke is damped by a pulse current applied to the lifting coil a very short time before impact and ceased when the stud contacts the workpiece.

3 Claims, 1 Drawing Sheet

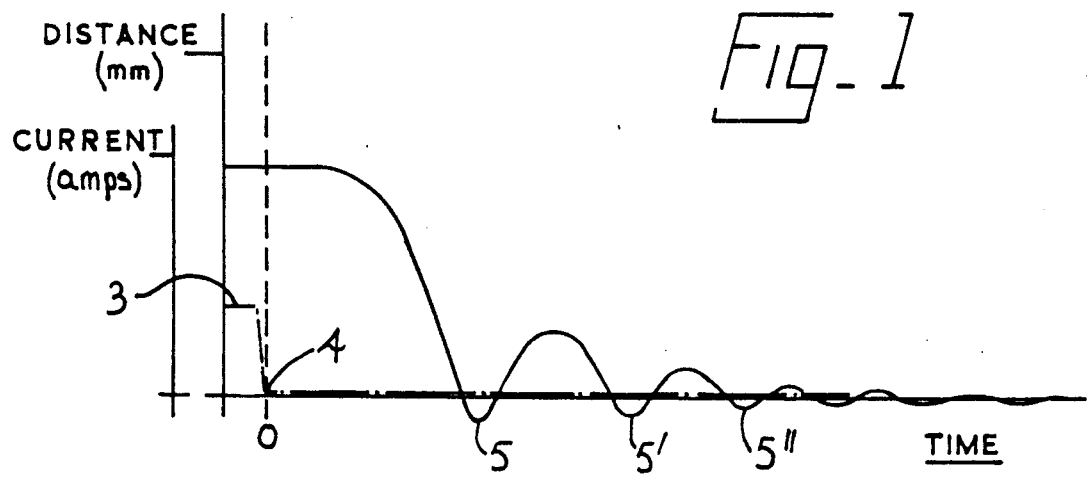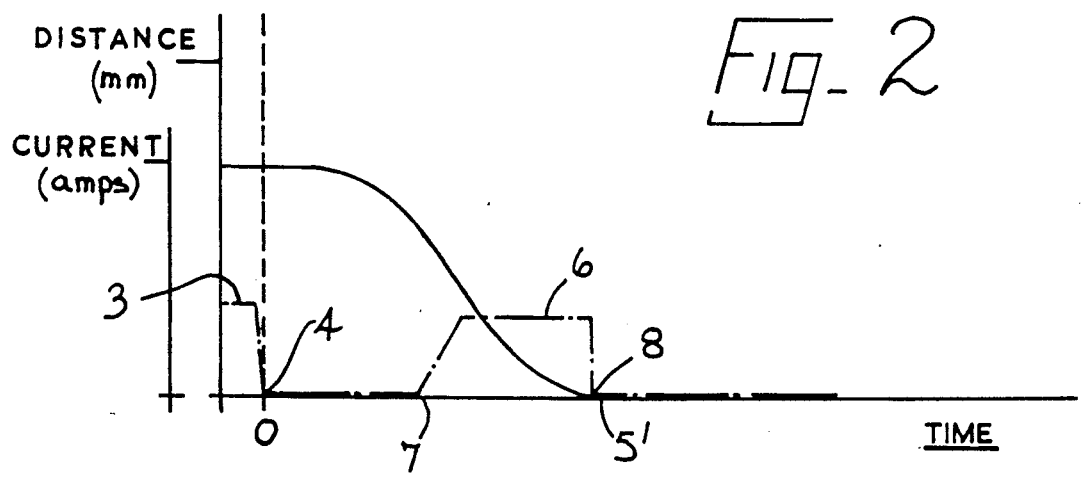

CONTROL OF STUD-WELDING APPARATUS

BACKGROUND OF THE INVENTION

The present invention relates to the control of stud-welding apparatus for automatic attachment of welding studs and in particular to the control of apparatus using the technique of arc ignition.

In arc ignition stud-welding apparatus, a stud is initially presented to contact a workpiece to which the stud is to be welded, and a current, often low, is then passed through the stud to create a short circuit and the stud is then withdrawn a predetermined distance (the "lift stroke") to create an arc which is used for the welding process. When the arc is ignited, the welding current is increased so that a pool of molten metal is formed at the welding point on the surface of the workpiece and the stud. The operation is completed by a plunge stroke which applies the stud to contact the workpiece through the molten pool. Subsequent solidification of this molten metal secures the stud to the workpiece.

In such apparatus the stud is carried by a stud carrier which is lifted from the workpiece as the arc is initiated and plunged back to the workpiece when full power has produced the requisite welding pool. In many common forms of apparatus, the lifting force is applied electromagnetically and a mechanical device such as a spring urges the stud-holder in the plunge direction, so that the electromagnetic lift has to operate against the plunger spring. Unfortunately the stud thus tends to complete the plunge stroke at high force and speed, and the impact as the stud contacts the workpiece may splatter molten metal around the weld, which is inefficient, unsightly and even dangerous.

There have been a number of proposals to damp the plunge stroke so that the contact of stud and workpiece is achieved with less force and at lower velocity. Typical proposals are described in U.S. Pat. Nos. 3,242,307 and 4,562,328. The latter discloses mechanical damping only the latter part of the plunger stroke, the initial part of the plunger stroke being free travel caused by the plunger spring without application of damping.

It is an object of the present invention to provide improved control of stud-welding apparatus comprising a stud-holder wherein an arc is initiated by passing a current through a stud held by the stud-holder in contact with the workpiece, the arc is established by lifting the stud from the workpiece and applying full power to the arc to form pools of molten metal on the stud and on the workpiece, and welding contact ("impact") finally made at the end of the plunge stroke wherein the plunge stroke is controlled without mechanical damping.

BRIEF DESCRIPTION OF THE INVENTION

According to the present invention, the control of stud-welding apparatus comprising a stud-holder, an electromagnetic lifting coil arranged and adapted to lift the stud-holder away from a workpiece to which it is applied and mechanical plunge return means tending to urge the stud-holder towards the workpiece so that in operation the electromagnetic lifting coil works against the mechanical plunge return means during the lift stroke and the plunge stroke is derived from the mechanical return means is characterized in that at the beginning of the plunge stroke the lifting coil is essentially current and voltage free but the plunge stroke is damped by a pulse current momentarily applied to the lifting coil a very short time before impact and ceased when the stud contacts the workpiece.

The duration of the pulse stroke is, of course, very short and the pulse current has ceased before impact.

The impact is consequently softened and weld splatter substantially reduced. The pulse current can thus be controlled in both time and strength to achieve a consistent drop time which is not longer than the drop time of undamped stud welding apparatus. The drop time is the time from the beginning of the plunge stroke until impact. The drop time is affected by factors such as gravitational force but by controlling the pulse current to give a consistent drop time it is possible to eliminate the effect of the gravitational field so that the drop time is consistent irrespective of the attitude of the welding apparatus in the gravitational field. Furthermore, the pulse current can be controlled to achieve zero velocity of the stud at impact. Consequently, no vibration of stud or workpiece occurs and the apparatus is self-damping.

The use of the lift solenoid during the plunge stroke of a stud-welding operation is disclosed in German patent specification DE No. 38 03 416 C but in this case the voltage supplied throughout the stroke is slowly reduced to zero at the end of the stroke. This inevitably gives rise to a longer drop time and it is not possible to provide the control to achieve a consistent drop time. Accordingly, the apparatus is very sensitive to gravitational effects and the drop time varies dramatically in accordance with the attitude of the apparatus in the gravitational field.

The magnetic force of many solenoids in common use is significantly affected through the stroke of the armature and the power generated by a constant current rapidly falls away as the gap between the armature and the solenoid increases. With a constant current maximum magnetic force results when the gap is zero but the force decreases directly depending upon the gap.

It is therefore preferred to use a solenoid having more uniform characteristics so that there is virtually no variation of force as the gap increases during the stroke of the armature. Such solenoids are described in "Roboter in der Geratetechnik"—G. Boglesack et al—published by Huthig 1985 (p 177).

In a preferred embodiment of the invention, we use a solenoid which can maintain substantially uniform power for more than 2½ mm so that effectively there is no loss of power during the operating stroke of 1.2 to 1.5 mm usual in a welding gun when such a solenoid is used in stud-welding apparatus.

This enables us to create consistently a reproducible magnetic force which is independent from the stroke. That is, provides a consistent magnetic force for the final part of the drop time.

BRIEF DESCRIPTION OF THE DRAWINGS

In order that the present invention can be better understood, it will now be described in greater detail with reference to the accompanying drawings in which:

FIG. 1 is a graph showing solenoid current and separation of a weld stud and workpiece in relation to time for hitherto known stud-welding apparatus, and FIG. 2 is a graph showing solenoid current and separation of a weld stud and workpiece in relation to time for stud-welding apparatus controlled in accordance with the present invention.

DETAILED DESCRIPTION OF DRAWINGS AND PREFERRED EMBODIMENT

In the drawings, the continuous line indicates the separation of a weld stud and workpiece by plotting this as distance d in mm against time (ms). The solenoid current (amps) is indicated by broken line plotted on the same time scale.

Since the present invention is concerned with the control of the plunge stroke of stud-welding apparatus, the time scale is referred to the beginning of the plunge stroke, that is the end of the supply of current to the electromagnetic coil.

At the beginning of a welding cycle, after the stud has made an initial contact with the workpiece, a current known as the lift current is passed through the electromagnetic lifting coil of the stud welding apparatus causing the stud to be lifted from the workpiece to draw the arc and the lift current is maintained in the solenoid for the period when the arc is supplied with full power. The lift current is indicated in the drawings at 3 and the plunge stroke begins at 4 when the lift current ceases so that the lifting coil no longer urges the stud away from the workpiece and thus the plunge stroke commences. If the plunge stroke is undamped, as in FIG. 1, the stud contacts the workpiece by impact indicated by 5, followed by succession impacts 5′,5″ etc. However, if the plunge stroke is controlled in accordance with the present invention, a pulse current indicated as in FIG. 2 is supplied to the lifting coil a very short time before impact. The strength and duration of the pulse current are chosen so that the plunge is brought smoothly to a halt at impact and thus the bounce of the stud against the workpiece is eliminated and the drop time is not increased compared with the drop time of undamped stud welding apparatus. The pulse current ceases before impact so that there is no lift effect in the lifting coil after impact.

The level of the pulse current and its duration (shown from 7 to 8) can readily be controlled to ensure that a constant drop time (from 4 to 5) can be achieved and the pulse current can be controlled so that the drop time becomes independent of the gravitational field.

We claim:

1. Method of controlling stud-welding apparatus for automatic attachment of welding studs comprising a stud-holder, an electromagnetic lifting coil arranged and adapted to lift the stud-holder away from a workpiece to which it is applied and mechanical plunge return means tending to urge the stud-holder towards the workpiece so that in operation the electromagnetic lifting coil works against the mechanical plunge return means during the lift stroke and the plunge stroke is derived from the mechanical return means characterized in that at the beginning of the plunge stroke the lifting coil is essentially current and voltage free but the plunge stroke is damped by a pulse current momentarily applied to the lifting coil a very short time before impact and ceased when the stud contacts the workpiece.

2. Method according to claim 1 wherein the pulse current is controlled in both time and strength.

3. Method according to claim 1 or 2, wherein the lifting coil of the stud-welding apparatus comprises a solenoid having substantially uniform power during the operating strokes of said apparatus.

* * * * *